July 1, 1958     T. J. McCUISTION     2,841,429

SEALING RING AND JOINT

Filed Oct. 4, 1955

INVENTOR.
TOMMY J. McCUISTION
BY
Oberlin + Limbach
ATTORNEYS.

United States Patent Office
2,841,429
Patented July 1, 1958

2,841,429

SEALING RING AND JOINT

Tommy J. McCuistion, Euclid, Ohio, assignor to Parker-Hannifin Corporation, a corporation of Ohio Application October 4, 1955, Serial No. 538,314

8 Claims. (Cl. 288—19)

This invention relates as indicated to a sealing ring and also to a joint of the character wherein such sealing or packing ring makes sealed engagement with opposed walls of a packing chamber defined by adjacent or telescoped members and thus prevents leakage of fluid (liquid or gas) between juxtaposed faces of said members. Obviously, said chamber defining members may be relatively fixed with respect to each other or they may be relatively movable, as, for instance, relatively rotatable or relatively reciprocable. In any event, the prime function of the sealing ring and the joint of which it is a part is to provide a fluid-tight seal between the aforesaid members.

It is a primary object of this invention to provide a unique design of sealing ring which, in combination with the chamber defining members, forms a fluid-tight seal at low pressures, as well as at high pressures.

It is another object of this invention to provide a sealing ring of the character indicated which effectively resists extrusion into the clearance spaces between the adjacent or telescoped packing chamber defining members.

It is another object of this invention to provide a sealing ring of the character indicated which is substantially unaffected, insofar as its sealing properties are concerned, by wide temperature variations.

It is another object of this invention to provide a sealing ring which is designed to have a relatively low frictional drag against a relatively moving surface even under the influence of high pressure.

It is another object of this invention to provide a sealing ring which, when installed in a chamber, is deformed to varying degrees, with greatest deformation in those zones of the ring which are relatively flexible and have essentially a line contact with the chamber surfaces and with least deformation in those zones of the ring which are solid, and thus not so flexible, and which have a surface contact, though relatively narrow, with the chamber surfaces.

It is another object of this invention to provide a recessed packing ring to which fluid under pressure has access for assisting in the formation of a fluid-tight seal.

It is another object of this invention to provide a sealing ring which, in various specific forms, seals in opposite directions contrary to V, U, flanged, and other prior art packings.

Still another object of this invention is to provide a sealing ring which forms a lubricant-retaining chamber with the relatively movable surface with which engaged.

Another object of this invention is to provide a sealing ring which (collectively and individually) has a relatively small projected area exposed to fluid pressure, which has a low starting and running friction, which has an overall cross-section form to resist "spiral failure" even though the radial dimension may be small in relation to the ring diameter, which utilizes pressure loading of lips thereof so as to require less squeeze, and which has relatively sharp sealing edges to achieve an effective fluid-tight seal even at low pressures and to result in low friction sealing.

Yet another object of this invention is to provide a sealing ring which synergetically combines the functions of a V-packing or a plurality of V-packings and of an O-ring while eliminating the disadvantages of both types of packings. Thus, the preset packing ring has appropriately been termed a "V-O" ring.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
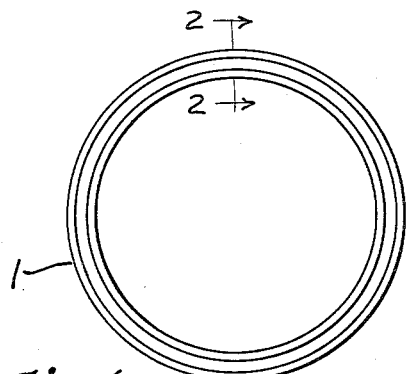
Fig. 1 is an elevation view of a packing ring according to this invention.
Figure 2:
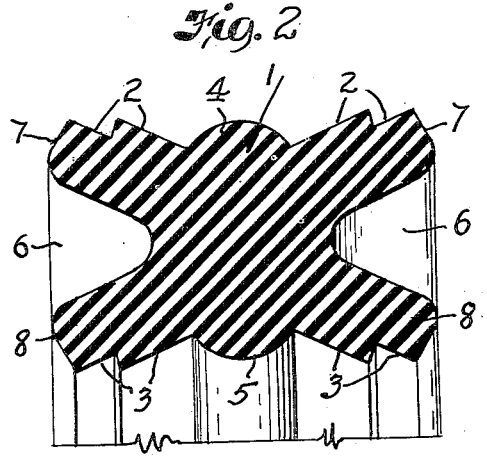
Fig. 2 is a radial cross-section view, on much enlarged scale, taken substantially along the line 2—2, Fig. 1.

As best shown in Figs. 1 and 2, a preferred form of sealing ring 1, molded as of synthetic rubber, exhibits oppositely facing pairs of relatively sharp ridges 2 and 3 of generally sawtooth form around the outside and inside peripheries of said ring and intervening rounded ribs 4 and 5 between the respective pairs of ridges 2 and 3.

The opposite ends of said sealing ring are preferably recessed as at 6 to provide outer and inner flexible lips 7 and 8 which are adapted to be relatively easily flexed radially apart to bring the relatively sharp edges of the ridges 2 and 3 into fluid-tight sealing engagement with the concentric walls of the chamber in which the sealing ring 1 is adapted to be placed.

In order to prevent tendency of the sealing ring of turning or twisting during relative axial movement of the member which carries the same and the member with which it is slidably sealed, the radial cross-section of the ring 1 is bounded by a rectangle in which the dimension in the axial direction is greater than in the radial direction.

The sharp sealing edges of the ridges 2 and 3 are dimensioned to be flexed or deformed radially to a greater extent than is the portion of the ring between the rounded ribs 4 and 5. In this way, a fluid-tight joint is assured while frictional drag in a rotary or reciprocatory joint structure is a minimum, because of the essentially line contacts of the ridges 2 and 3 and of the relatively low pressure, relatively narrow surface contacts of the rounded ribs 4 and 5 with the concentric walls of the chamber in which said ring 1 is adapted to be inserted.

The sealing ring 1 herein is preferably made of synthetic rubber selected or compounded so as to be chemically inert (with respect to the particular fluid with which it comes into contact), and it is not the purpose of this invention to disclose any particular synthetic rubber compositions which render the rings made therefrom suitable for use with particular fluids.

All in all, the prime requisite is that the packing ring 1 be of elastomeric material, including not only what are commonly referred to as synthetic rubber, but as well flexible plastics such as polyethylene, tygon, etc. which have utility in certain installations.

Figure 3:
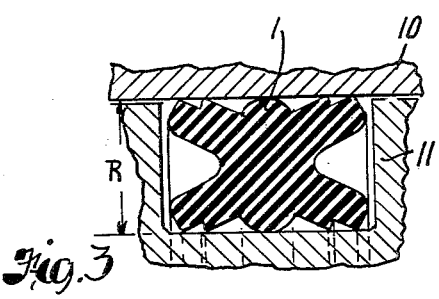
Fig. 3 is a fragmentary radial cross-section view showing the Figs. 1 and 2 sealing ring as installed in an annular chamber formed between telescoped members which may be relatively rotatable about the ring axis or relatively reciprocable longitudinally of said ring axis, as desired.

In Fig. 3 is shown two members 10 and 11 forming an annular chamber therebetween in which the packing ring 1 of Figs. 1 and 2 is disposed so as to effect fluid-tight seals to preclude the passage of fluid between said ring and the concentric walls of such chamber contacted by the ridges 2 and 3 and ribs 4 and 5.

Obviously, the member 11 may be a reciprocating piston while the other member 10 is a cylinder. Because the movement of the members 10 and 11 is relative, the member 10 formed with the packing groove may be the stationary member or the movable member, as desired.

In fact, the members 10 and 11 may rotate relatively instead of reciprocating axially, or said members 10 and 11 both may be stationary as in a boss joint or the like wherein said members are threaded together or are equipped with flanges bolted together, and in such event, the axially opposed end walls of the packing chamber need not be contained in one member 11 as shown, but, instead, one member may be provided with one end wall and the bottom of the groove, whereas the other member has the other end wall and the outer wall.

In a boss joint, one of the end walls of member 11 may be radially extended to radially overlap and abut a complementary shoulder of the other member 10.

As previously indicated, the radial dimension R of the packing ring chamber should be slightly less than the radial dimensions of the sealing ridges 2 and 3 and sealing ribs 4 and 5 so that, under conditions of low pressure, fluid-tight seals will be established owing to the resilient expanding influence of the packing ring 1 against the concentric walls of the packing chamber.

It can be seen that, under conditions where high pressure acts at one end of the packing ring 1, the latter will be urged thereby toward the opposite end wall of the packing chamber and the fluid under high pressure in one recess 6 will separate the lips 7 and 8 to cause the sealing edges of ridges 2 and 3 at that end of the packing ring 1 to be forced apart to tightly engage the concentric chamber walls.

At the same time, the axial compression of the packing ring 1 will, to some measure, tend to radially swell the intermediate portion containing the ribs 4 and 5 radially outward and inward into fluid-tight engagement with such concentric chamber. In addition, the recesses 6 compensate for expansion or swelling of the ring 1 without causing excessive pressure contact between the edges of ribs 2 and the surface 10.

As a further feature, it is to be noted that the packing ring forms several chambers which, in the case of hydraulic oil, serve, to some extent, to trap oil therein to assist in maintaining a constant lubrication of the relatively sliding surfaces of the packing ring 1 and the member 10 with respect to which it slides axially or rotates.

As a still further distinctive feature of the present invention, even under conditions of very high pressure, the area of the packing ring 1 in contact with the member 10 will be relatively small so as not to build up excessive frictional drag.

Accordingly, the present packing ring 1, in the form thereof shown in Fig. 3, performs the combined functions of the conventional O-ring and multiple V-rings without the inherent disadvantages of either type of ring. The ring 1 seals effectively in both directions.

Figure 4:
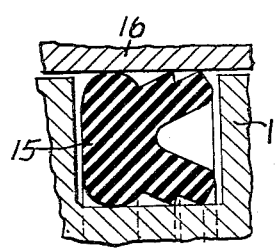

Referring now to the Fig. 4 packing ring and installation, this is essentially the same as Fig. 3 with the exception that, when the high pressure is always from one side, the right-hand side in Fig. 4, the packing ring 15 in the packing chamber formed by members 16 and 17 may be the same as ring 1 except formed to provide only one pair of external and internal ridges and one external and internal rounded rib 4 and 5 with a recess 6 to provide lips 7 and 8 spread apart by fluid under pressure.

Figure 5:
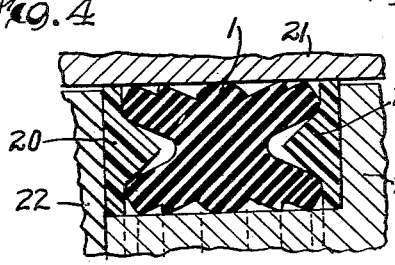

In Fig. 5, there is illustrated a further modification in the installation of the sealing ring 1 wherein plastic or like backup spreader rings 20 are provided to constantly maintain the lips 7 and 8 apart and with ridges 2 and 3 in sealed engagement with the opposed concentric walls of the packing chamber, which herein may be of three-piece construction 21, 22, and 23 in the event that spreader rings 20 are not sufficiently elastic to be assembled in the same way as packing ring 1. In addition, the rings 20 may serve to close the gap or clearance between members 21 and 22—23 to preclude extrusion of ring 1 under extremely high pressures.

Figure 6:
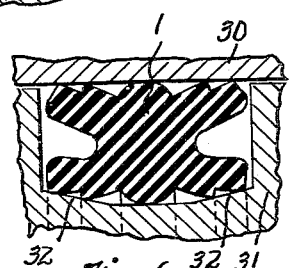

In Fig. 6, the sealing ring 1 is installed in a chamber formed by members 30 and 31, the latter being provided with oppositely tapered frusto-conical walls 32 in the bottom of the packing groove thereof so as to effect an increased stressing of the packing ring 1 for efficient low pressure sealing while yet preserving all of the advantages of high pressure sealing without extrusion.

Figure 7:
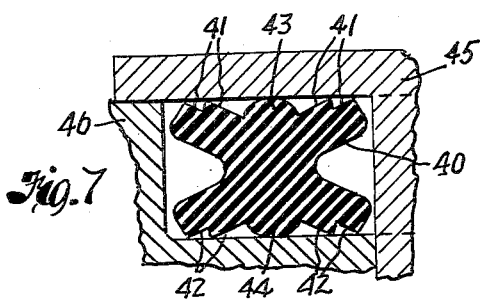
Figs. 4 to 8 are cross-section views similar to Fig. 3 except illustrating modifications in the sealing ring and/or the chamber in which it is installed.

The sealing ring 40 shown in Fig. 7 in cross-section resembles the Figs. 1 and 2 sealing ring 1 except turned 90° to provide four co-planar and concentric sealing ridges 41 on one side and four co-planar and concentric sealing ridges 42 on the other side. The packing ring 40 in Fig. 7 is also provided with opposite rounded ribs 43 and 44 lying concentrically between oppositely facing pairs of the ridges 41 and 42.

This form of the packing ring 40 is especially suited for use in boss joints or relatively rotating member joints, the packing chamber being defined by parallel plane end walls of members 45 and 46, respectively, with which the ridges 41 and rib 43 and ridges 42 and rib 44 contact as shown, and radially spaced-apart inner and outer cylindrical walls of said members. Here again, it is a matter of indifference as to which of the aforesaid four walls of the packing chamber are formed in which of the members 45 and 46.

Figure 8:
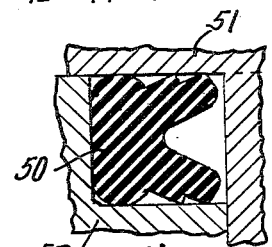

The Fig. 8 ring 50 is like ring 40 of Fig. 7 except that ring 50 omits the outwardly facing pairs of ridges for use in installations wherein the high fluid pressure is acting from the inside of said ring 50 toward the outside. The packing chamber is formed by members 51 and 52. It is noted that ring 50 is like ring 15 of Fig. 4 except turned 90°.

Obviously, the packing joints of Figs. 3–8 are to be regarded merely as exemplary; and, if desired, split expander rings or garter springs may be employed to urge the lips either outwardly or inwardly or both.

Referring now to the packing rings 1 and 15 from their functional standpoints, it is quite evident that, under conditions of shrinkage, a seal of fluid-tight nature is yet maintained with the inner packing chamber wall by the internal ridges 3 of lips 8 and the internal rounded rib 5. Because of the initial compression on the outer ridges 2 of lips 7 and on the outer rounded rib 4, these ridges and rib will remain in fluid-tight sealing engagement with the outer packing chamber wall even when there is shrinkage of the packing ring. Similarly, under conditions of swelling of the packing ring, effective sealing is retained; and, in fact, the swelling of the ring section between ribs 4 and 5 will enhance the sealing engagement with the concentric chamber walls.

In any event, by providing a recess or recesses 6, fluid under pressure is effective to spread apart the lips of the packing ring, but without substantially increasing the contact area between the ridges. Thus, in rotary and reciprocatory joints, low frictional drag of the packing ring is a characterizing feature.

It is to be noted that the rounded ribs of the sealing rings herein engage the opposite walls of the packing chambers essentially in line contact. The packing rings are, in each case, a solid body of elastic material which is under slight radial compression (Figs. 1 to 6) or slight axial compression (Figs. 7 and 8) when installed, and when subjected to fluid pressure, is compressed to additional degree but at right angles. This increases the contact pressure, but, owing to the reliefs on both sides, there is no substantial spreading out of the line contact to a wide, high friction surface contact.

Those skilled in the art will further recognize that various modifications may be made in the packing chamber design; for instance, more than one packing chamber may be provided, a lubricant groove may be provided between adjacent packing chambers, two or more packing rings may be installed in a single chamber, or the packing ring may function as a valve having engagement only with, say, one of the cylindrical walls of the packing chamber to permit bleeding without buildup of excessive high pressure acting on the packing ring itself as the part carrying the same reciprocates back and forth initially relative to the packing ring and then in unison therewith, sealing engagement being alternately effected between the opposite ends of the packing ring and the axially spaced-apart walls of the chamber.

By way of specific example, in one packing chamber, as in Fig. 3, the dimension "R" was .130"±.002" and the axial dimension was .275"±.003". The packing ring 1 of 70 durometer hardness synthetic rubber which was installed in such packing chamber was of .2468"±.003" axial dimension, of .145"±.003" radial dimension across the peaks of the ridges 2 and 3, and of .140" radial dimension across the ribs 4 and 5.

The inclined surfaces of the ridges 2 and 3 were at an angle of about 25° relative to the ring axis and the ribs 4 and 5 were of .035" radius.

From the above outlined details of one packing ring 1, it can be seen that the ring 1 will be radially deformed across the ridges 2 and 3 about .015", that is, .145"–.130", such deformation being facilitated by provision of lips 7 and 8. Said ring 1 will also be radially deformed across the solid section between rigs 4 and 5 about .010" in much the same way as an O-ring is radially deformed.

However, in the present case, the rounded rib section has a cross-section curvature of .035" radius, whereas an equivalent O-ring would have a cross-section curvature of .105" radius. Therefore, with the much smaller curvature, the ultimate flattening due to radial deformation is much less with consequent reduced area of surface contact and the unit pressure due to initial compression is much less. Even under severe pressure conditions, the surface contact of the flattened ribs 4 and 5 with the packing chamber walls cannot be nearly as great as it is when a conventional O-ring is employed. Furthermore, because the ridges 2 and 3 have frusto-conical end faces as shown, there is no curling or buckling of the sharp edges when the packing ring is installed in a packing groove or thereafter.

In the use of the present packing ring 1 as a seal between a piston and a cylinder, the oppositely disposed generally saw-tooth formations of the ridges 2 and 3 assist in maintaining an efficient seal against leakage in both directions of movement of the piston. The ring 1 as above described has operated in an industrial accumulator under a pressure of 80 p. s. i. for over 10,000 cycles without a single drop of leakage, whereas an O-ring installation in an identical setup leaked a considerable amount after that many cycles of operation.

Figure 10:
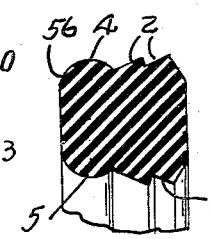
Figs. 9 and 10 are radial cross-section views of rings similar to those in Figs. 2 and 4, respectively.
Figure 9:
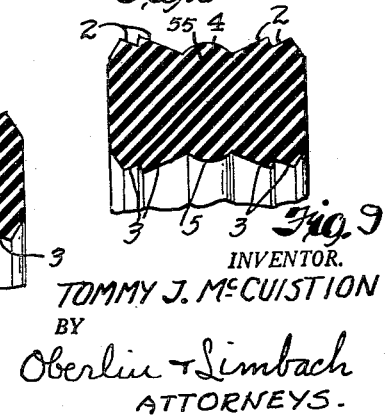

In Figs. 9 and 10, there are shown modified forms of sealing rings 55 and 56 similar to those in Figs. 2 and 4 respectively, except omitting the recesses 6 between ridges 2 and 3. The rings 55 and 56 may otherwise be substantially identical with the rings 1 and 15 or with rings 40 and 50 in Figs. 7 and 8, so as to function in exactly the same way insofar as fluid-tight sealing, low friction, resistance to spiral twist, and lubrication are concerned.

Other modes of applying the principle of the invention may be employed, change being made as regards the details described, provided the features stated in any of the following claims, or the equivalent of such, be employed.

I therefore particularly point out and distinctly claim as my invention:

1. A flexible sealing ring comprising an annulus of elastomeric material which, in radial cross-section, comprises a solid resiliently deformable section having oppositely convexly rounded ribs adapted to make sealed engagement with opposite walls of a packing chamber, and an adjacent section having opposite relatively sharp edge and resiliently deformable ridges also adapted to make sealed engagement with such opposite walls of the packing chamber, said ring being formed with annular grooves between the respective ribs and ridges to provide separated regions of sealing with such opposite walls.

2. The ring of claim 1 wherein the end of said adjacent section is formed with an annular recess between such opposite ridges defining relatively flexible ridge-carrying lips arranged to be spread apart by fluid under pressure in such recess.

3. A flexible sealing ring integrally formed with a solid resiliently deformable section of generally oval radial cross-section disposed between adjacent sections each providing a relatively sharp-edged pair of ridges, said ring being adapted to be squeezed between opposite walls of an annular packing chamber that are spaced apart a distance less than the major diameter of said solid section and less than the distance between said ridges, said ring being formed with circular grooves between the respective ridges and adjacent portions of said solid section whereby said ridges and solid section make engagement with such opposite walls at spaced apart regions therealong.

4. The ring of claim 3 wherein each end of said ring is formed with an annular recess between said ridges so as to define relatively flexible ridge-carrying lips that are more easily deformed than said solid section when said ring is installed in such annular packing chamber.

5. A flexible sealing ring having opposite faces adapted to seal against opposite walls of an annular packing chamber, each face being formed with two pairs of oppositely facing, continuous ridges of generally saw tooth form and a continuous convexly rounded solid rib between the respective pairs of ridges, the distance from one face to the other being less across said ribs than across said ridges whereby the portions of said ring between said ridges are deformed to greater extent than the portion between said solid ribs when said ring is installed in a packing chamber in which the opposite walls are uniformly spaced apart.

6. A flexible sealing ring having opposite faces adapted to seal against opposite walls of an annular packing chamber, each face being formed with at least two oppositely facing, continuous ridges of generally saw tooth form and a continuous convexly rounded solid rib between said ridges, the ends of said ring further being formed with annular recesses which provide relatively flexible lips, each carrying at least one of said ridges, said ribs having a curvature of radius less than one-half the distance between said ribs.

7. In combination, a pair of members defining an annular packing chamber therebetween, and a flexible packing ring in such chamber; said ring having opposite faces thereof in sealed engagement with opposite walls of such chamber, at least one such face being shaped to provide a continuous relatively sharp-edged sealing ridge, an adjacent continuous convexly rounded solid sealing rib, and an intervening annular groove between said ridge and rib; such chamber and ring being dimensioned to deform the ridged portion of the latter to a greater degree than the ribbed portion.

8. In combination, a pair of members defining an annular packing chamber therebetween, and a flexible packing ring in such chamber, said ring having opposite faces thereof in sealed engagement with opposite walls of such chamber, such faces each being shaped to provide pairs of oppositely facing ridges of generally saw tooth form and a convexly rounded solid rib between the respective pairs of ridges, and said ring being recessed at its ends to form relatively flexible lips each of which carries at least one ridge of the respective pairs of ridges for ease of flexing and for fluid pressure actuation of said lips for pressing the ridges carried thereby into fluid tight engagement with such packing chamber walls, said ring and chamber further being dimensioned so that said ring is squeezed to greater extent at the lips of such faces than at the ribs of such faces.

References Cited in the file of this patent
UNITED STATES PATENTS

| | | |
|---|---|---|
| 1,690,047 | Armbruster | Oct. 30, 1928 |
| 2,181,203 | Reynolds | Nov. 28, 1939 |
| 2,661,229 | Slaughter | Dec. 1, 1953 |
| 2,688,506 | Bapper | Sept. 7, 1954 |
| 2,700,561 | Svenson | Jan. 25, 1955 |